United States Patent
Shu et al.

(10) Patent No.: US 10,621,654 B2
(45) Date of Patent: Apr. 14, 2020

(54) METHOD FOR QUICK SHOPPING BY USING WASHING MACHINE AND WASHING MACHINE

(71) Applicant: QINGDAO HAIER DRUM WASHING MACHINE CO., LTD., Shandong (CN)

(72) Inventors: Hai Shu, Shandong (CN); Sheng Xu, Shandong (CN); Tao Zhang, Shandong (CN); Zhenxing Huang, Shandong (CN)

(73) Assignee: QINGDAO HAIER DRUM WASHING MACHINE CO., LTD., Qingdao, Shangdong (CN)

( * ) Notice: Subject to any disclaimer, the term of this patent is extended or adjusted under 35 U.S.C. 154(b) by 86 days.

(21) Appl. No.: 15/781,799

(22) PCT Filed: Nov. 24, 2016

(86) PCT No.: PCT/CN2016/107067
§ 371 (c)(1),
(2) Date: Jun. 6, 2018

(87) PCT Pub. No.: WO2017/097111
PCT Pub. Date: Jun. 15, 2017

(65) Prior Publication Data
US 2018/0365756 A1 Dec. 20, 2018

(30) Foreign Application Priority Data
Dec. 7, 2015 (CN) .......................... 2015 1 0896681

(51) Int. Cl.
*G06Q 30/00* (2012.01)
*G06Q 30/06* (2012.01)

(52) U.S. Cl.
CPC ......... *G06Q 30/0641* (2013.01); *G06Q 30/06* (2013.01); *G06Q 30/0625* (2013.01); *G06Q 30/0633* (2013.01)

(58) Field of Classification Search
CPC .. G06Q 10/08; G06Q 10/087; G06Q 10/0875; G06Q 30/06;
(Continued)

(56) References Cited

U.S. PATENT DOCUMENTS 6,798,997 B1 9/2004 Hayward et al.
6,799,085 B1 9/2004 Crisp, III
(Continued)

FOREIGN PATENT DOCUMENTS

CN 103307841 A 9/2013
CN 103334256 A 10/2013
(Continued)

OTHER PUBLICATIONS

Samsung WW9000 smart washing machine offers full LCD touchscreen, smartphone-like controls. Britta O'Boyle | Apr. 23, 2014. https://www.pocket-lint.com/smart-home/news/samsung/128570-samsung-ww9000-smart-washing-machine-offers-full-lcd-touchscreen-smartphone-like-controls (Year: 2014).*
(Continued)

*Primary Examiner* — William J Allen
(74) *Attorney, Agent, or Firm* — Buchanan Ingersoll & Rooney PC (57) ABSTRACT

A method for quick shopping by using a washing machine comprises: enabling the washing machine to receive a trigger signal; sending a quick shopping command to a server, wherein the quick shopping command comprises identity recognition information and an identifier of the trigger signal; enabling the server to search for a commodity selecting condition corresponding to the quick shopping
(Continued)

command, and send commodities that meet the commodity selecting condition to an intelligent terminal bound with the washing machine after the server receives the quick shopping command; and enabling the intelligent terminal to display the selected commodities on a display interface, wherein the displayed information at least comprises commodity identifiers and URL addresses corresponding to the commodity identifiers. According to the scheme, the method realizes quick shopping of commodities by using the washing machine, simplifies the online shopping operation of users, and saves shopping time.

7 Claims, 4 Drawing Sheets (58) Field of Classification Search
CPC .... G06Q 30/0601–0643; G06Q 30/08; H04W 4/00; H04W 4/24; H04W 4/30; H04W 4/33; H04W 4/35; H04W 4/38; H04W 4/70

See application file for complete search history.

(56) References Cited

U.S. PATENT DOCUMENTS

| | | | | |
|---|---|---|---|---|
| 8,301,514 | B1* | 10/2012 | Vippagunta | G06Q 30/0631 705/14.49 |
| 9,948,685 | B2* | 4/2018 | Na | H04L 12/2818 |
| 2009/0319272 | A1* | 12/2009 | Coulomb | G06Q 30/0603 704/251 |
| 2012/0316984 | A1* | 12/2012 | Glassman | G06Q 10/06 705/26.7 |
| 2014/0052573 | A1* | 2/2014 | Oh | G06Q 10/10 705/26.8 |
| 2014/0195383 | A1* | 7/2014 | Kim | G06Q 30/0633 705/26.62 |
| 2014/0365912 | A1* | 12/2014 | Shaw | G06F 3/04817 715/748 |
| 2015/0026007 | A1* | 1/2015 | Mangalvedkar | G06Q 30/0633 705/26.8 |
| 2015/0302857 | A1* | 10/2015 | Yamada | G10L 15/22 704/275 |
| 2015/0332382 | A1 | 11/2015 | Aso et al. | |
| 2016/0155443 | A1* | 6/2016 | Khan | G06F 1/3203 704/275 |
| 2016/0342625 | A1* | 11/2016 | Ogita | G06Q 30/0623 |
| 2017/0032446 | A1* | 2/2017 | Merz | G06Q 30/0603 |

FOREIGN PATENT DOCUMENTS

| | | | | |
|---|---|---|---|---|
| CN | 203249464 U | | 10/2013 | |
| CN | 104881805 A | * | 9/2015 | ............. G06Q 30/06 |
| CN | 105405044 A | | 3/2016 | |
| WO | 2014/050088 A1 | | 4/2014 | |
| WO | 2014/141665 A1 | | 9/2014 | |

OTHER PUBLICATIONS

International Search Report (PCT/ISA/210) dated Feb. 21, 2017, by the Chinese Patent Office as the International Searching Authority for International Application No. PCT/CN2016/107067.

Extended European Search Report dated Aug. 14, 2018, issued by the European Patent Office in corresponding European Application No. 16872303.9. (7 pages).

Office Action (Notification of Reasons for Refusal) dated Nov. 5, 2019, by the Japanese Patent Office in corresponding Japanese Patent Application No. 2018-548260 and English translation of the Office Action. (13 pages).

* cited by examiner

METHOD FOR QUICK SHOPPING BY USING WASHING MACHINE AND WASHING MACHINE

TECHNICAL FIELD

The disclosure relates to the field of washing machines and particularly to a method for quick shopping by using a washing machine and the washing machine.

BACKGROUND

With upgrading of washing machines, washing machines have more and more functions, including a function of automatically adding a detergent and a softener, and a function of giving a prompt to remind a user to purchase corresponding washing supplies in time even when the detergent and the softener are going to be used up.

At present, people always need to remember to purchase the washing supplies and then purchase the washing supplies directly in a supermarket or search the corresponding washing supplies in a shopping mall on a mobile phone or a computer, select one commodity, place an order and pay for the order to finish the purchase. However, the following case often happens in life, when washing clothes, the user finds that the washing supplies are used up and remembers to buy the washing supplies at that time but forgets after being engaged in other tasks; when needing to employ the washing supplies again, the user finds that the washing supplies have been used up. As a result, shopping cannot be realized in time and quickly, it takes a plenty of time for the user to search the washing supplies again on an online shopping mall and comparing the washing supplies one by one, and it is especially inconvenient for white-collar workers in fast-paced cities. Consequently, a washing machine by which a user can realize quick shopping in time after the washing supplies are used up is badly in need.

On that account, the method for quick shopping by using the washing machine and the washing machine are provided.

SUMMARY

In order to overcome the disadvantages in the prior art, which is the technical problem to be solved by the disclosure, a method for quick shopping by using the washing machine is provided. Through simply operating the washing machine, the washing machine receives a trigger signal, a server selects commodities automatically and sends the selected commodities to an intelligent terminal bound with the washing machine for displaying, and a user directly clicks a link on the intelligent terminal to purchase the commodities. Therefore, the user can quickly purchase the commodities on the washing machine when the washing supplies are used up, the user operation is simplified, and quick purchasing of the washing supplies is realized.

Another object of the disclosure is to provide a washing machine adopting the method.

The technical scheme adopted for solving the technical problem is as follows:

A method for quick shopping by using a washing machine is provided, the method comprising:

S1, enabling the washing machine to receive a trigger signal;

S2: sending a quick shopping command to a server, wherein the quick shopping command comprises identity recognition information and an identifier of the trigger signal;

S3: enabling the server to search for a commodity selecting condition corresponding to the quick shopping command, and send commodities that meet the commodity selecting condition to an intelligent terminal bound with the washing machine after the server receives the quick shopping command; and S4: enabling the intelligent terminal to display the selected commodities on a display interface, wherein the displayed information at least comprises commodity identifiers and URL addresses corresponding to the commodity identifiers.

Furthermore, the corresponding relationship between the quick shopping command and the commodity selecting condition is preset in the server.

Furthermore, before the step S1, the method further comprises the step of setting the corresponding relationship between the quick shopping command and the commodity selecting condition, the setting method comprising:

A1, binding the washing machine on the intelligent terminal;

A2, enabling the intelligent terminal to obtain the identity recognition information and the identifier of the trigger signal, and store the identity recognition information and the identifier of the trigger signal into the quick shopping command; and A3, enabling the intelligent terminal to set the commodity selecting condition corresponding to the quick shopping command and store the corresponding relationship between the quick shopping command and the commodity selecting condition into the server.

Furthermore, the identity recognition information comprises a washing machine code and/or a user ID.

Furthermore, before the step S4, the method further comprises:

popping out prompt information on the display interface of the intelligent terminal, wherein the prompt information is used for prompting whether to display the selected commodities on the display interface of the terminal or not; and if yes, performing the step S4.

Furthermore, the commodity selecting condition comprises at least one of commodity category, name, brand, article number of commodity barcode, specification, price range, model, style, shopping mall name and store name; or the commodity selecting condition comprises a URL address of a commodity recommendation page.

Furthermore, a quick shopping device is arranged on the washing machine; and the quick shopping device, when being triggered, can send the trigger signal to the washing machine.

Furthermore, the quick shopping device is a touch panel; and when the touch panel is activated according to a preset track, the trigger signal corresponding to the preset track is sent to the washing machine, and the step S1 is carried out; or the quick shopping device is a physical key, and when the physical key is pressed down according to a preset key-press mode, the trigger signal corresponding to the preset key mode is sent to the washing machine, and the step S1 is carried out, or the quick shopping device is a combined key composed of at least two existed keys on the washing machine; and when the combined key is pressed down, the trigger signal corresponding to the combined key is sent to the washing machine, and the step S1 is carried out.

The disclosure also provides a washing machine adopting the method. The washing machine is provided with a quick shopping device used for triggering the washing machine to send a quick shopping command to a server, and the server sends recommended commodities to an intelligent terminal bound with the washing machine according to the quick shopping command.

Furthermore, the quick shopping device is a touch panel arranged on the washing machine; a mode for triggering the touch panel comprises touching the touch panel according to a preset track; or the quick shopping device is a physical key arranged on the washing machine, and modes for triggering the physical key comprise at least any one of pressing once, continuously pressing twice, continuously pressing for three times, long pressing once, shortly pressing once and then long pressing once, and shortly pressing twice and then long pressing once; or the quick shopping device is a combined key composed of at least two existed keys on the washing machine, and a mode for triggering the combined key comprises pressing down all the keys which compose the combined key at the same time.

The technical scheme provided by the specific embodiments of the disclosure has the beneficial effects:

the washing machine, when receiving the trigger signal, sends the quick shopping command to the server, the server, after receiving the quick shopping command, selects the commodities and sends the selected commodities to the intelligent terminal bound with the washing machine for displaying, and the user can directly click the link to purchase the commodities on the intelligent terminal. So that the user can quickly purchase the commodities on the washing machine when the washing supplies are used up, the user operation is simplified, the purchasing time of the user is saved, the purchasing efficiency of the user is increased, and quick purchasing of the washing supplies is realized.

BRIEF DESCRIPTION OF THE DRAWINGS

In order to describe the technical solutions in the specific embodiments of the disclosure more clearly, a simple introduction on the accompanying drawings which are needed in the specific embodiments is given below. Apparently, the accompanying drawings in the description below are merely some of the embodiments of the disclosure, according to which other drawings may be obtained by those of ordinary skill in the art without any creative effort.

DETAILED DESCRIPTION

In the method for quick shopping by using the washing machine, the washing machine is in communication connection with the server, the server is in communication connection with the intelligent terminal, the communication technology can be any of WIFI, GPRS, ZigBee and RS-485 technologies, and the intelligent terminal can be a smartphone/PAD/PC. Wherein, the server is used for providing washing machine management platform services including, registration and management of user accounts, and binding and management of the washing machine and the user accounts; the server also sends a control command to the washing machine and receives information reported by the washing machine, and also synchronizes the running state of the washing machine to the intelligent terminal. After an APP capable of controlling the washing machine is installed on the intelligent terminal, accounts can be registered on the intelligent terminal and also can be bound with the washing machine.

The implementation modes are further described below, in combination with accompanying drawings and embodiments.

Embodiment I

Figure 1:
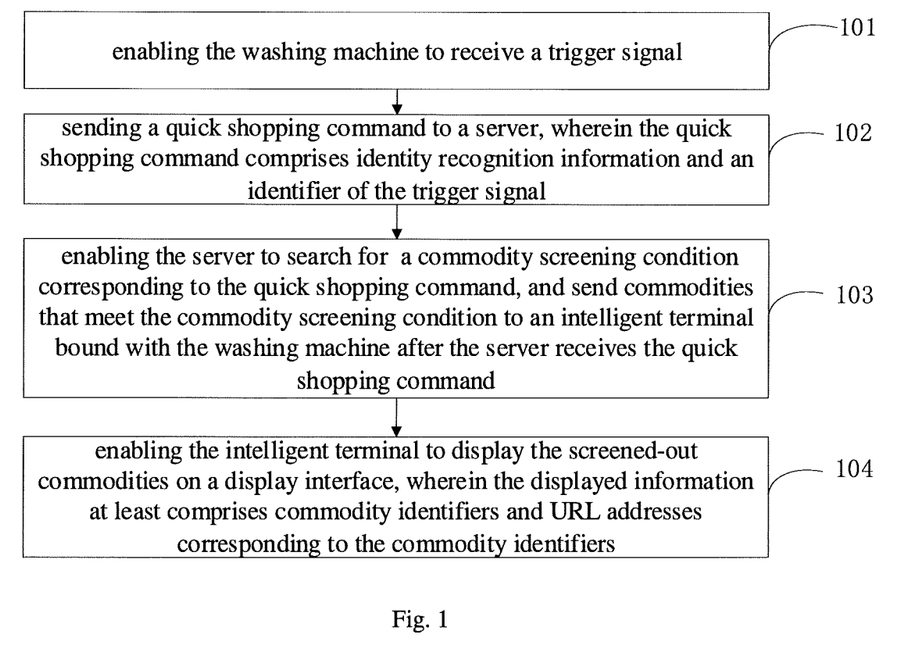
FIG. 1 is a flow diagram of a method for quick shopping by using a washing machine provided by the disclosure.

The embodiment provides a method for quick shopping by using a washing machine, and the washing machine is in communication connection with the server; and as shown in FIG. 1, the method comprises the following steps.

Step 101, the washing machine receiving a trigger signal.

Specifically, a quick shopping device can be arranged on the washing machine, and when being triggered, the quick shopping device sends the trigger signal to a control module of the washing machine.

Preferably, the quick shopping device can be a touch panel arranged on the washing machine, and when a user touches the control panel according to a preset track, the trigger signal corresponding to the preset track is sent to the control module of the washing machine.

Wherein, the touch panel is obtained by plating a surface of transparent glass with a layer of tin antimony oxide thin film, namely a protective film, and electronic signal anti-interference processing needs to be carried out between the transparent glass and a liquid crystal display screen; and the touch panel is the direct manifestation of the touch technology and is used for sensing a touch signal, and analyzing and distinguishing the touch signal. Therefore, when the user touches the touch panel according to one track, the touch panel can correspondingly sense the touch track of the user.

Wherein, the preset tracks can be in any pattern, the preset track of each pattern is one triggering mode, the preset tracks of different patterns correspond to different triggering modes, and each triggering mode corresponds to one trigger signal. Preferably, the preset tracks can be pre-set in the washing machine by a developer. For example, the track preset in the washing machine is a letter pattern C, and when the user touches the touch panel according to the letter pattern C, the trigger signal corresponding to the letter pattern C is sent to the control module of the washing machine. Further preferably, the preset track can be set by the user freely and stored in the washing machine.

Further preferably, the quick shopping device is a physical key arranged on the washing machine, and when the physical key is pressed down according to a preset key-press mode, the trigger signal corresponding to the preset key-press mode is sent to the washing machine.

Wherein, the key-press mode of the physical key can be pre-set in the washing machine by a developer, and each key-press mode is a triggering mode which corresponds to one trigger signal. Preferably, the key-press modes at least comprise any one of pressing once, continuously pressing twice, continuously pressing for three times, long pressing once, shortly pressing once and then long pressing once, and shortly pressing twice and then long pressing once.

For example, the preset triggering modes comprise pressing once and continuously pressing for three times which respectively correspond to a first trigger signal and a second trigger signal; when the user continuously presses the physical key for three times, the physical key sends the second trigger signal to the control module of the washing machine, and the control module of the washing machine receives the second trigger signal.

Preferably, the physical key is a newly added key besides a power key, a start/pause key, a washing program key and washing parameter keys, wherein the washing parameter keys are used for controlling various parameters in the washing program, such as rinsing, dewatering, water level, time, temperature, drying and rotating speed.

Figure 5:
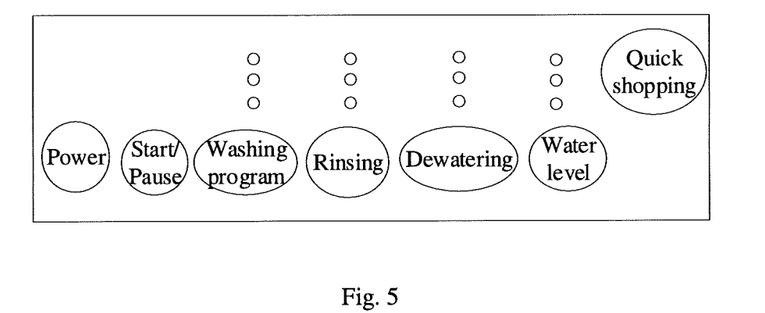
FIG. 5 is a structural schematic diagram of a control panel of the washing machine provided by the disclosure.

For example, as shown in FIG. 5, the washing machine is provided with the power key, the start/pause key, the washing program key, the rinsing key, the dewatering key, the water level key and the quick shopping key. The quick shopping key is the quick shopping device used for triggering the washing machine to send the quick shopping command to the server, and the server selects commodities according to the quick shopping command and displays the selected commodities on the intelligent terminal bound with the washing machine.

Preferably, the physical key is any one of the washing parameter keys; after the washing program is selected, and if the physical key is triggered, the function of the corresponding washing parameter is performed; and when the washing program is not selected, and if the physical key is triggered, the function of triggering the washing machine to send the quick shopping command to the server is performed.

Figure 6:
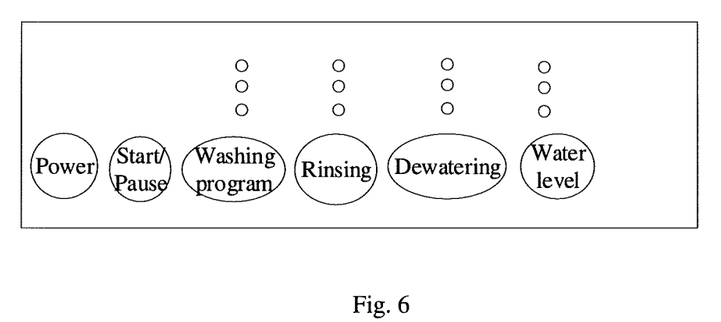
FIG. 6 is structural schematic diagram of another control panel of the washing machine provided by the disclosure.

For example, as shown in FIG. 6, the washing machine is provided with the power key, the start/pause key, the washing program key, the rinsing key, the dewatering key and the water level key; the water level key also can be used as the quick shopping device which triggers the washing machine to send the quick shopping command to the server; after the washing machine is started and when the washing program is not selected, the water level key, if being pressed down, plays a shopping function at the moment, that is to say, the trigger signal corresponding to the water level key is sent to the washing machine so as to trigger the washing machine to send the quick shopping command to the server; and after the washing program is selected, the water level key, if being pressed down, plays the function of setting the water level of the washing machine.

Preferably, the quick shopping device is a combined key composed of any at least two keys on the washing machine, and when the combined key is pressed down, the trigger signal corresponding to the combined key is sent to the washing machine.

A mode for triggering the combined key comprises pressing all the keys which compose the combined key at the same time.

For example, the quick shopping device of the washing machine as shown in FIG. 6, is a combined key composed of the rinsing key, the dewatering key and the water level key; and when the rinsing key, the dewatering key and the water level key are pressed down at the same time, the trigger signal corresponding to the combined key is sent to the washing machine.

No matter whether the quick shopping device is the physical key, the touch panel or the combined key and no matter which triggering mode is adopted, the user enables the triggering device to send the trigger signal to the washing machine only by performing a one-step operation. Therefore, the user operation becomes extremely simple and convenient, and less time is consumed.

Step 102, sending a quick shopping command to the server, wherein the quick shopping command comprises identity recognition information and the identifier of the trigger signal.

Specifically, the washing machine, when receiving the trigger signal, obtains the identifier of the trigger signal and the identity recognition information correspondingly, stores the identifier and the identity recognition information into the quick shopping command and sends the quick shopping command to the server.

Wherein, the trigger signal and the identifier of the trigger signal are pre-stored in the washing machine; the identity recognition information can be the washing machine code or the user ID. Specifically, each washing machine, when leaving a factory, has a unique code which is used for identifying different washing machine devices; the code can be pre-set in a control module of each washing machine; after the washing machine receives the trigger signal, the code can be obtained from the control module of the washing machine; the user ID can be the account for the user to log in the server; the account is unique in the server and is used for identifying different users; the user account can be pre-set in the control module of the washing machine; and after the washing machine receives the trigger signal, the account can be obtained from the control module of the washing machine.

Step 103, after receiving the quick shopping command, the server searching for a commodity selecting condition corresponding to the quick shopping command, and sending commodities that meet the commodity selecting condition to an intelligent terminal bound with the washing machine.

Wherein, the corresponding relationship between the quick shopping command and the commodity selecting condition is preset in the server. To be specific, the corresponding relationship can be added into the server by the developer after the user who purchases the washing machine fills out the corresponding information; and preferably, the corresponding relationship can be set actively by the user at the webpage of a corresponding APP client or a corresponding PC end and stored in the server.

Specifically, the server, after receiving the quick shopping command, searches for the commodity selecting condition corresponding to the quick shopping command, searches for commodities that meet with the commodity selecting condition in an online shopping mall and sends the selected commodities to the intelligent terminal bound with the washing machine; preferably, the server generates a link address for the selected commodities and sends the link address to the intelligent terminal. And furthermore, the server can send the link address to the intelligent terminal through the network, and also can store the link address in a text message and send the link address to the intelligent terminal as SMS.

Preferably, at least one online shopping mall is searched by the server; at least one commodity is selected by the server; and if no commodity is selected by the server, the server generates a link address for commodities related to the commodity selecting condition and sends the link address to the intelligent terminal.

Wherein, the commodity selecting condition comprises restricting at least one of commodity category, name, brand, article number of the commodity barcode, specification, price range, model, style, shopping mall name and store name, and preferably the combination of any factor; and the factors can be in relationships such as "and" and "or". Preferably, the commodity name indicates the commodity related to the washing machine, and preferably the washing supplies.

For example, the commodity category indicates the washing supplies; the name is washing powder, detergents, softeners and the like; the brand is Tide, Liby and the like; the specification is n kg, n ml and the like; the shopping mall name is EHaier, Tmall and the like; the store name is an XX flagship store; the price range is RMB 0-n Yuan; and the model/style is a full-effect fragrance type, lavender gentle scent type and the like.

The article number of the commodity barcode is the barcode on the outer package of the commodity; one commodity produced by one factory is determined according to the barcode, for example, for the commodity with the article number of "6920174700787", the commodity is Liby full-effect care high-concentration liquid detergent with the specification of 500 g.

Preferably, the commodity selecting condition further comprises the URL (Uniform Resource Locator) address of the commodity recommendation interface; the URL address is used for pointing to a target address of one commodity recommendation interface; and if the URL address of the commodity recommendation interface serves as the commodity selecting condition, the server is unnecessary to select the commodity on the online shopping mall, but directly sends the URL address to the intelligent terminal bound with the washing machine, so that the user can click the URL address to jump to the commodity recommendation interface.

Preferably, after this step, the method for quick shopping by using the washing machine further comprises the step of popping out prompt information on the display interface of the intelligent terminal, wherein the prompt information is used for prompting whether to display the selected commodities on the display interface of the terminal or not; and if yes, performing the step S4; and if no, popping out a prompt of whether to delay or not by the intelligent terminal, if yes displaying the prompt information again after the preset time by the intelligent terminal, and if no cancelling the prompt information and ignoring the selected commodities sent by the server this time.

For example, the prompt information popped out by the intelligent terminal on the display interface is "A piece of detergent recommendation information from the washing machine is received, whether to open", and "Open" and "Cancel" options are given on the display interface. When the user selects the "Open", the intelligent terminal executes the step 104. When the user selects the "Cancel", the intelligent terminal pops out a prompt "Redisplay after 1 h, OK?" on whether to delay or not on the display interface and provides two operation options, namely "Delay for 1 h" and "Don't display again". If the user chooses the "Delay for 1 h", the intelligent terminal redisplays the prompt information "A piece of detergent recommendation information from the washing machine is received, whether to open" after 1 h. If the user chooses the "Don't display again", the terminal ignores the recommended commodities sent by the server at this time.

Step 104, the intelligent terminal displays the selected commodities on the display interface, wherein the displayed information at least comprises the commodity identifiers and the URL addresses corresponding to the commodity identifiers.

Wherein, the commodity identifiers can be the commodity name; the URL addresses are used for pointing to the unique target addresses of the commodities in the online shopping mall. After the target address is determined, a portion of the commodity attribute are correspondingly determined, such as the shopping mall name, the store name, the commodity category, the name, the brand, the specification, the model, the style and the price. The user who clicks the URL address enters the commodity purchasing page for commodity purchasing. Preferably, the displayed information further comprises commodity pictures corresponding to the commodity identifiers.

Figure 7:
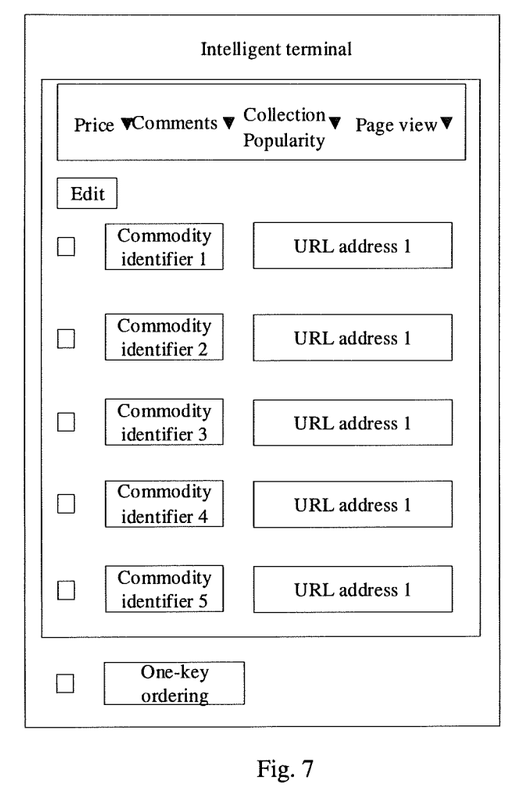
FIG. 7 is a schematic diagram of a display interface of an intelligent terminal provided by the disclosure.

Preferably, at least one sequencing standard option which is used for sequencing the recommended commodities according to a sequencing standard is also displayed on the display interface of the intelligent terminal. As shown in FIG. 7, the sequencing standard comprises at least one of sequencing according to the price, sequencing according to the comments, sequencing according to the collection popularity, and sequencing according to the page view of the online shopping mall; the sequencing according to the page view of the online shopping mall refers to sequencing according to the click rate of the main page of the shopping mall. The user can select one sequencing standard option manually to sequence the selected commodities, and also can switch among the sequencing standard options.

In this embodiment, the washing machine, after receiving the trigger signal, directly sends the quick shopping command to the server, the server, after receiving the quick shopping command, selects the commodities and sends the selected commodities to the intelligent terminal bound with the washing machine for displaying, and the user can directly click the link to purchase the commodities on the intelligent terminal, so that the user can quickly purchase the commodities on the washing machine when the washing supplies are used up. The user operation is simplified, the purchasing time of the user is saved, the purchasing efficiency of the user is increased, and quick purchasing of the washing supplies is realized.

Embodiment II

On the basis of the embodiment I, the user can purchase the commodities displayed on the display interface of the terminal according to a conventional purchasing mode and also can perform one-key ordering on the commodities in this embodiment.

The conventional purchasing mode means that the user directly clicks a commodity URL address to enter the corresponding commodity purchasing page, selects the commodity attributes (such as the style and the number), then clicks the immediate purchasing option to enter a setting page for setting receiver information, confirms the ordering after the receiver information is well set, then enters a payment page and inputs a payment password after selecting the payment mode; and at the moment, the server generates a commodity order.

One-key ordering for the commodity means that a one-key ordering option (as shown in FIG. 7) is arranged on the display page for the selected commodities, and the user selects at least one commodity by checking the option box in front of one commodity identifier and then clicks the one-key ordering option to directly generate commodity orders for all the ticked commodities; or after the user clicks one URL address to enter the corresponding commodity purchasing page, the one-key ordering option is arranged on the commodity purchasing page; if attribute setting is needed, the user can firstly set the attributes (such as the style and the number) on the commodity purchasing page and directly generate a commodity order for the commodities in the URL address after clicking the one-key ordering option.

Figure 2:
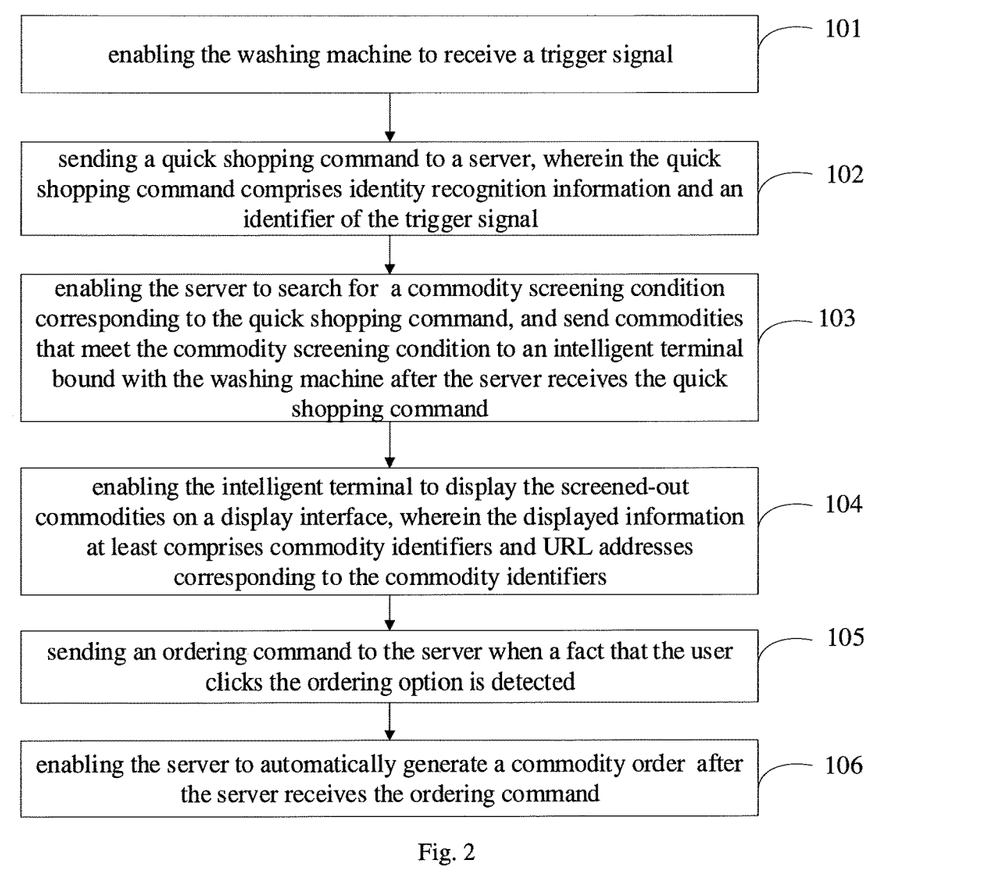
FIG. 2 is flow diagram of another method for quick shopping by using a washing machine provided by the disclosure.

Specifically, after the step 104, as shown in FIG. 2, the method of performing one-key ordering on the commodities comprises the following steps.

Step 105, sending an ordering command to the server when detecting that the user clicks the one-key ordering option.

Preferably, when detecting that the user clicks the one-key ordering option, a prompt of whether to confirm the ordering or not is popped out on the display interface of the intelligent terminal, and operational options "confirm" or "cancel" are provided; when the user selects the "confirm" option, the intelligent terminal sends the ordering command to the server; and when the user selects the "cancel" option, this ordering is cancelled directly.

Step 106, after receiving the ordering command, the server automatically generating a commodity order.

After receiving the ordering command, the server specifically performs the steps as follows.

Step (1), the server obtains commodity attributes according to the URL addresses corresponding to the commodity identifiers.

Wherein, the URL addresses are used for pointing to the unique target addresses of the commodities in the online shopping mall; after the target address is determined, a portion of the commodity attributes is correspondingly determined, such as, the shopping mall name, the store name, the commodity category, the name, the brand, the specification, the model, the style and the price.

The shopping mall name is EHaier, Tmall and the like; the store name is an XX flagship store; the commodity category indicates the washing supplies; the name is washing powder, detergents, softeners and the like; the brand is Tide, Liby and the like; the specification is n kg, n ml and the like; and the model/style is a full-effect fragrance type, lavender sweet scent type and the like.

Step (2), the server searches for preset receiver information and payment mode, and generates a commodity order automatically.

The receiver information and the payment mode are preset in the server. To be specific, the corresponding information can be added into the server by the developer after the user who purchases the washing machine fills out the corresponding information; and preferably, the corresponding information is filled out actively by the user at the webpage of a corresponding APP client or a corresponding PC end and stored in the server.

After obtaining the commodity attributes, the server obtains the login state of the user account. If the user does not log in, reminding the user to log in, and if the user logs in, searching for the default receiver information and the default payment mode of the login user, paying for the commodity automatically according to the preset payment mode, generating a commodity order according to the receiver information. The server sends the commodity order to a merchant and reminds the merchant of the new commodity order; the merchant selects the corresponding commodity according to the commodity attributes of the commodities in the commodity order, fills out the logistic express waybill according to the receiver information and sends the commodity to the address of the receiver through an express company or a logistics company.

Furthermore, the receiver information at least comprises the receiver name, the receiver phone number and the delivery address, preferably further comprises the postcode of the delivery address. The payment mode includes online payment or pay on delivery; for the online payment, the selectable payment systems (such as credit card payment, debit card payment, Alipay payment or Wechat payment) can be set in advance; the payment mode further comprises the preferential payment sequence of the payment system (for example the Alipay payment is used preferentially, and the Wechat payment is used if the Alipay payment fails); and the payment mode further comprises payment limitation setting (for example automatic payment is allowed if the one-time payment is less than RMB 200 Yuan, the monthly payment cannot exceed 500 Yuan).

Preferably, the user can enter the APP and log in the user account to set the receiver information and the payment mode after the washing machine is bound with the intelligent terminal.

In this embodiment, the washing machine, after receiving the trigger signal, sends the quick shopping command to the server, the server, after receiving the quick shopping command, selects the commodities and sends the selected commodities to the intelligent terminal bound with the washing machine for displaying, and the user can perform one-key ordering on one commodity on the intelligent terminal and also can perform quick ordering on commodities in batches, so that the user can purchase the commodities quickly on the washing machine when the washing supplies are used up, the user operation is simplified, the purchasing time of the user is saved, the purchasing efficiency of the user is increased, and quick purchasing of the washing supplies is realized.

Embodiment III

In this embodiment, the washing machine is in communication connection with the server, the server is in communication connection with the intelligent terminal, an APP capable of controlling the washing machine is installed on the intelligent terminal, and the user can register an account on the intelligent terminal and bind the account with the washing machine.

The washing machine is provided with a quick shopping device. The quick shopping device comprises at least one triggered triggering mode; each triggering mode corresponds to one trigger signal; and according to different trigger signals, the user can set different commodity selecting conditions on the intelligent terminal, preferably commodities selected according to the commodity selecting condition are the commodities related to the washing machine, and further preferably, the washing supplies. As the household washing supplies are generally placed near the washing machine, the washing supplies can be purchased quickly through the quick shopping device on the washing machine when the user finds that the washing supplies are going to be used up.

Figure 3:
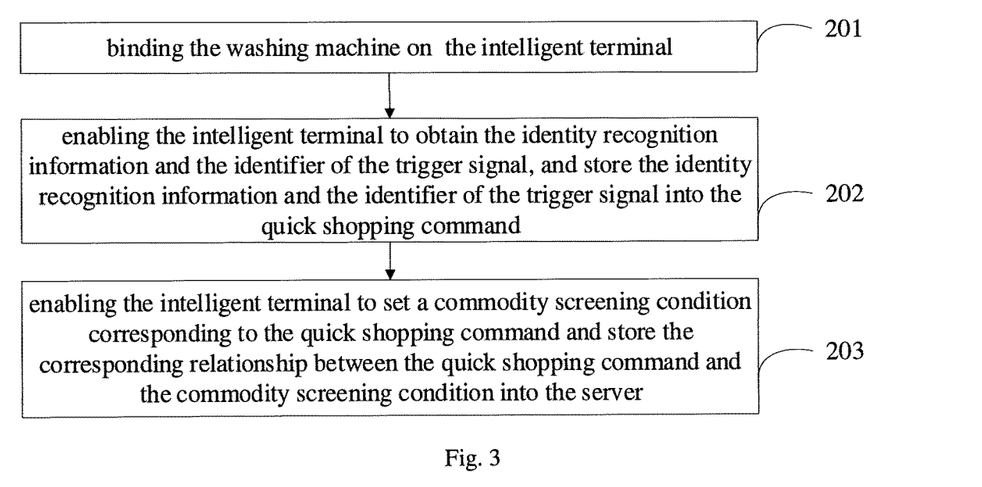
FIG. 3 is a flow diagram of a setting method provided by the disclosure.

When using the quick shopping device for the first time, the user performs corresponding setting on the quick shopping device on the intelligent terminal; and as shown in FIG. 3, the setting method comprises the following steps.

Step 201, binding the washing machine on the intelligent terminal.

Specifically, after the washing machine is started, the intelligent terminal enables a washing machine searching function, and is automatically connected and bound with the washing machine when the washing machine is detected. Connection between the intelligent terminal and the washing machine is built through the WIFI technology, the Bluetooth technology and the like.

If the intelligent terminal and the washing machine fail in connection, the user also can input the model of the washing machine actively on the page of the intelligent terminal to bind the washing machine on the intelligent terminal.

For example, for the XX brand A-309S model washing machine, the user enables the washing machine searching function at the intelligent terminal, and the intelligent terminal is automatically connected and bound with the washing machine automatically through the WIFI when the "XX brand A-309S model" washing machine is detected.

Step 202, the intelligent terminal obtaining the identity recognition information and the identifier of the trigger signal, and storing the identity recognition information and the identifier to the quick shopping command.

The step of obtaining the identifier of the trigger signal specifically comprises: after the washing machine and the intelligent terminal are bound, enabling the intelligent terminal to obtain the model of the washing machine and display all the triggering modes corresponding to the washing machine of the model on a terminal setting interface, and when the user selects one triggering mode, enabling the intelligent terminal to obtain the identifier of the trigger signal corresponding to the triggering mode.

For example, for a washing machine with a model of A-309S of the XX brand, the washing machine is provided with a physical key with the corresponding triggering modes, including pressing once, continuously pressing twice and continuously pressing for three times; after the intelligent terminal is bound with the washing machine with the model of A-309S, the intelligent terminal obtains the model "A-309S" and displays the triggering modes, including "pressing once, continuously pressing twice and continuously pressing for three times" on the setting interface; and when the user selects the triggering mode "pressing once" on the setting interface, the intelligent terminal obtains the identifier of the trigger signal corresponding to the triggering mode "pressing once".

Wherein, the identity recognition information is the washing machine code or the user ID; each washing machine, when leaving a factory, has a unique code which is used for identifying different washing machine devices; the user ID is the account for the user to log in the server; the account is unique in the server and is used for identifying different users.

The step of obtaining the user ID specifically comprises: directly obtaining the user ID logged in at the intelligent terminal and synchronizing the user ID to the control module of the washing machine, so that the washing machine, when receiving the trigger signal, can obtain the user ID, store the user ID in the quick shopping command of the washing machine, and send the quick shopping command to the server.

For example, the user ID logged in at the intelligent terminal is a mobile phone number "136**1234", the intelligent terminal directly obtains the user ID "136**1234" and synchronizes the user ID to the washing machine.

The step of obtaining the washing machine code specifically comprises: obtaining the washing machine code from the washing machine, or obtaining the washing machine code when the user inputs the washing machine code at the intelligent terminal is detected.

For example, the factory code of the washing machine is "20150910**1234", the intelligent terminal obtains the code "201509101234" from the washing machine, or the user directly inputs the code "20150910**1234" on the setting interface of the intelligent terminal.

Specifically, the intelligent terminal, after obtaining the identity recognition information and the identifier of the trigger signal, stores the identity recognition information and the identifier of the trigger signal into the quick shopping command; preferably, the quick shopping command stored by the intelligent terminal is the same as quick shopping command in the washing machine; further preferably, the quick shopping command stored by the intelligent terminal also can be synchronized to the washing machine.

For the quick shopping command including the identity recognition information and the identifier of the trigger signal, quick shopping commands sent by different washing machine devices or user IDs are different; different triggering modes correspond to different trigger signals; and the quick shopping commands sent by the same washing machine device or user ID are also different. Therefore, each quick shopping command is unique.

Step 203, the intelligent terminal setting a commodity selecting condition corresponding to the quick shopping command and storing the corresponding relationship in the server.

Specifically, after the intelligent terminal stores the identity recognition information and the identifier of the trigger signal into the quick shopping command and when the user sets the commodity selecting condition on the setting interface is detected, the intelligent terminal stores information set by the user, builds a corresponding relationship between the quick shopping command and the commodity selecting condition and stores the corresponding relationship in the server.

The commodity selecting condition is set by limiting the commodity attribute information; furthermore, the intelligent terminal displays the entire commodity attributes on the setting interface for the user to select and also matches the most approximate commodity attribute according to the information manually input by the user. After the user selects one commodity attribute, the intelligent terminal displays the related commodity attributes on the setting interface; further preferably, when the user sets the commodity attributes, the intelligent terminal also selects other default commodity attributes automatically and displays the selected commodity attributes on the setting interface; and the user can modify the default commodity attributes.

Furthermore, after the user setting is completed or in the setting process, the intelligent terminal also uploads the commodity selecting condition set by the user to the server in real time; the server searches for commodities that meet the commodity selecting condition in real time; and if no commodity that meets the commodity selecting condition exists, the server also sends a prompt about no matched commodity to the intelligent terminal, and the intelligent terminal displays the prompt on the setting interface.

The user can set the default receiver information on the setting interface, so that the user who clicks the link to purchase the commodity can directly obtain the default receiver information without refilling out the receiver information while placing an order. Preferably, the intelligent terminal also can detect the historical purchasing records of the user and set the receiver information in the historical purchasing records into the default receiver information automatically; and the user also can change the receiver information.

In this embodiment, for an intelligent Internet-of-Things washing machine which supports installation of an APP, the APP also can be directly installed on the washing machine; and the user can register an account on the washing machine and bind the account with the washing machine and set the commodity selecting condition corresponding to the quick shopping command on the washing machine and store the corresponding relationship in the server.

After the setting is completed and the setting content is stored, the user, when shopping every time in future use, triggers the quick shopping device on the washing machine according to the set triggering modes, the washing machine performs the method in the embodiment I to recommend corresponding commodities to the user, and the user directly clicks the link according to the actual need to purchase the commodities. Therefore, the purchasing operation of the user is simplified, the purchasing time of the user is saved, and the user experience is improved.

Embodiment IV

Figure 4:
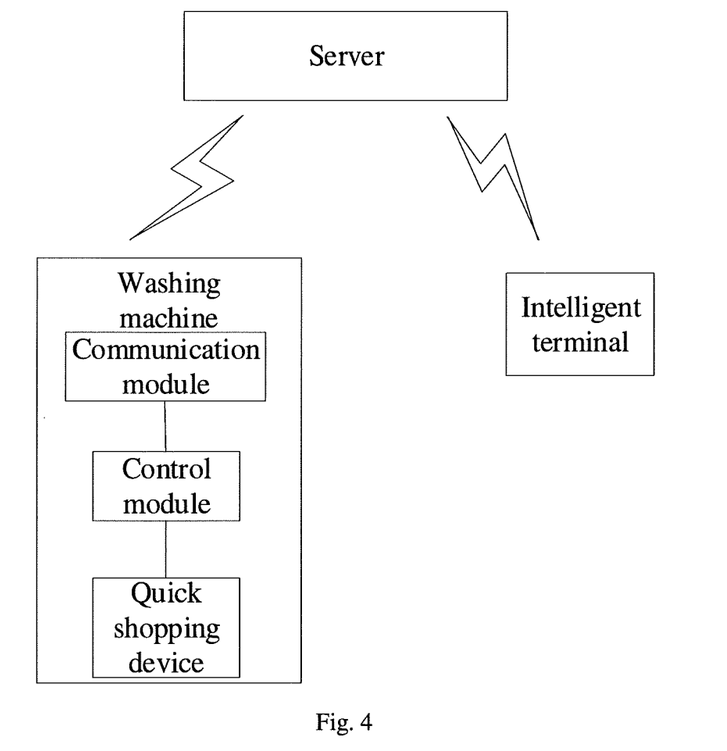
FIG. 4 is a structural schematic diagram of a washing machine provided by the disclosure.

As shown in FIG. 4, the embodiment provides a washing machine. The washing machine is an Internet-of-Things washing machine. The washing machine is provided with a quick shopping device used for triggering the washing machine to send a quick shopping command to the server; the server searches for a commodity selecting condition corresponding to the quick shopping command according to the quick shopping command, sends the commodities that meet the commodity selecting condition to the intelligent terminal and displays the selected commodities on the intelligent terminal; and the user directly clicks the link to purchase the commodities.

Specifically, the washing machine comprises a communication module and a control module; the washing machine is in data interaction with the server through the communication module. The quick shopping device, when being triggered, sends the corresponding trigger signal to the control module of the washing machine; the control module, after receiving the trigger signal, sends a corresponding quick shopping command to the server through the communication module. The quick shopping command comprises identity recognition information and an identifier of the trigger signal; and the server, after receiving the quick shopping command, finds a commodity selecting condition corresponding to the quick shopping command. The corresponding relationship between the quick shopping command and the commodity selecting condition is preset in the server, and the server selects the commodities that meet the commodity selecting condition automatically and sends the selected commodities to the intelligent terminal bound with the washing machine for displaying.

Preferably, the quick shopping device is a touch panel arranged on the washing machine; a mode for triggering the touch panel comprises touching the touch panel according to a preset track. The touch panel is obtained by plating a surface of transparent glass with a layer of tin antimony oxide thin film, namely a protective film, and electronic signal interference preventing processing needs to be carried out between the transparent glass and a liquid crystal display screen; and the touch panel is the direct manifestation of the touch technology and is used for sensing a touch signal, and analyzing and distinguishing the touch signal. Therefore, when the user touches the touch panel according to one track, the touch panel can correspondingly sense the touch track of the user.

The preset tracks can be in any pattern, the preset track of each pattern is one triggering mode, the preset tracks of different patterns correspond to different modes, and each triggering mode corresponds to one trigger signal. Preferably, the preset tracks is pre-set in the washing machine by a developer. For example, the track preset in the washing machine is a letter pattern C, the triggering mode is touching the touch panel according to the track letter C.

Further preferably, the quick shopping device is a physical key arranged on the washing machine, the key-press mode of the physical key can be pre-set in the washing machine by a developer, and each key-press mode is a triggering mode which corresponds to one trigger signal. Preferably, modes for triggering the physical key at least comprise any one of pressing once, continuously pressing twice, continuously pressing for three times, long pressing once, shortly pressing once and then long pressing once, and shortly pressing twice and then long pressing once.

Preferably, the physical key is a newly added key besides a power key, a start/pause key, a washing program key and washing parameter keys, wherein the washing parameter keys are used for controlling various parameters in the washing program, such as rinsing, dewatering, water level, time, temperature, drying and rotating speed.

For example, as shown in FIG. 5, the washing machine is provided with the power key, the start/pause key, the washing program key, the rinsing key, the dewatering key, the water level key and the quick shopping key; the quick shopping key is the quick shopping device and is used for triggering the washing machine to send the quick shopping command to the server, and the server selects commodities according to the quick shopping command and displays the selected commodities on the intelligent terminal bound with the washing machine.

Preferably, the physical key is any one of the washing parameter keys; after the washing program is selected, and if the physical key is triggered, the function of the corresponding washing parameter is performed; and when the washing program is not selected, and if the physical key is triggered, the function of triggering the washing machine to send the quick shopping command to the server is performed.

For example, as shown in FIG. 6, the washing machine is provided with the power key, the start/pause key, the washing program key, the rinsing key, the dewatering key and the water level key; the water level key also can be used as the quick shopping device which triggers the washing machine to send the quick shopping command to the server. After the washing machine is started and when the washing program is not selected, the water level key, if being pressed down, plays a shopping function at the moment, that is to say, a trigger signal corresponding to the water level key is sent to the washing machine so as to trigger the washing machine to send the quick shopping command to the server; and after the washing program is selected, the water level key, if being pressed down, plays the function of setting the water level of the washing machine.

Preferably, the quick shopping device is a combined key composed of any at least two keys on the washing machine, and a mode for triggering the combined key comprises pressing down all the keys which compose the combined key at the same time.

For example, the quick shopping device, as shown in FIG. 6, is the combined key composed of the rinsing key, the dewatering key and the water level key; and a mode for triggering the combined key comprises pressing down the rinsing key, the dewatering key and the water level key at the same time.

No matter whether the quick shopping device is the physical key, the touch panel or the combined key and no matter which triggering mode is adopted, the user can perform ordering within one step by using the washing machine. The washing machine capable of shopping not only improves the shopping habits of users, but also saves shopping time of the users; the shopping efficiency of the users is increased, the user experience in shopping is greatly improved, and the user experience in using the washing machine is also improved.

The description aforementioned is merely the preferred embodiments of the disclosure rather than restrictions in any form on the disclosure. Although the disclosure is illustrated with reference to the aforementioned embodiments, the embodiments are not used for restricting the disclosure and any technicians familiar with the patent can change or modify a little by utilizing the technical content involved in the disclosure to form equivalent embodiments having the same change within the scope of the technical solutions of the disclosure; and any simple modifications, equivalent changes and modifications of the embodiments which do not make the technical nature of the disclosure depart from the content of the technical solutions of the disclosure still fall in the scope of the solutions of the disclosure.

The invention claimed is:

1. A method for quick shopping by using a washing machine comprising:
    A1, connecting the washing machine with an intelligent terminal;
    A2, the intelligent terminal obtaining an identity recognition information and an identifier of a trigger signal and storing the identity recognition information and the identifier of the trigger signal into a quick shopping command; and
    A3, the intelligent terminal setting a commodity selecting condition corresponding to the quick shopping command and storing a corresponding relationship between the quick shopping command and the commodity selectin condition into a server:
    S1, receiving the trigger signal by the washing machine;
    S2, sending the quick shopping command to the server, wherein the quick shopping command comprises the identity recognition information and the identifier of the trigger signal;
    S3, the server searching for the commodity selecting condition corresponding to the quick shopping command, and sending commodities that meet the commodity selecting condition to the intelligent terminal connected with the washing machine after the server receives the quick shopping command; and
    S4, the intelligent terminal
    displaying selected commodities on a display interface of the intelligent terminal, wherein a displayed information at least comprises a commodity identifier and a URL address corresponding to the commodity identifier.

2. The method for quick shopping by using the washing machine according to claim 1, wherein the identity recognition information comprises a washing machine code and/or a user ID.

3. The method for quick shopping by using the washing machine according to claim 1, further comprising,
    before the step S4, displaying prompt information on the display interface of the intelligent terminal,
    wherein the prompt information is used for prompting whether to display the selected commodities on the display interface of the terminal or not; if yes, performing the step S4.

4. The method for quick shopping by using the washing machine according to claim 1, wherein the commodity selecting condition comprises at least one of a group consisting of a commodity category, a name, a brand, an article number of commodity barcode, a specification, a price range, a model, a style, a shopping mall name and a store name; or
    the commodity selecting condition comprises a URL address of a commodity recommendation page.

5. The method for quick shopping by using the washing machine according to claim 1, wherein a quick shopping device is arranged on the washing machine;
    and the quick shopping device, when being triggered, sends the trigger signal to the washing machine.

6. The method for quick shopping by using the washing machine according to claim 5, wherein the quick shopping device is a touch panel; and when the touch panel is activated according to a preset track, the trigger signal corresponding to the preset track is sent to the washing machine, and the step S1 is carried out; or
    the quick shopping device is a physical key, and when the physical key is pressed down according to a preset key-press mode, the trigger signal corresponding to the preset key-press mode is sent to the washing machine, and the step S1 is carried out; or
    the quick shopping device is combined keys composed of at least two keys existed on the washing machine; and when the combined keys are pressed down, the trigger signal corresponding to the combined keys is sent to the washing machine, and the step S1 is carried out.

7. The method for quick shopping by using the washing machine according to claim 3, wherein the commodity selecting condition comprises at least one of a group consisting of a commodity category, a name, a brand, an article number of commodity barcode, a specification, a price range, a model, a style, a shopping mall name and a store name; or
    the commodity selecting condition comprises a URL address of a commodity recommendation page.

* * * * *